Dec. 3, 1963    A. J. MORRIS    3,112,738
PISTONS FOR INTERNAL COMBUSTION ENGINES
Filed May 22, 1962
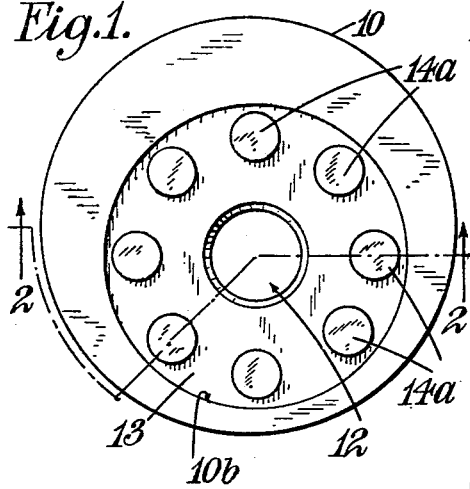
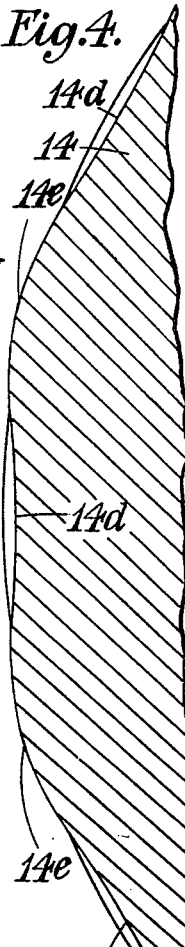
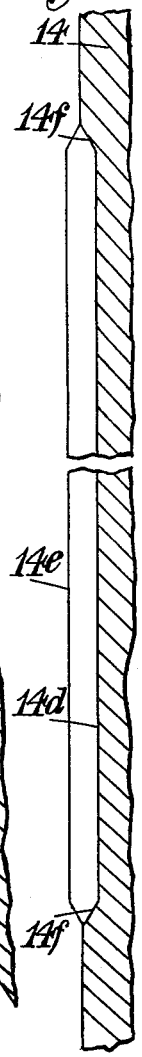
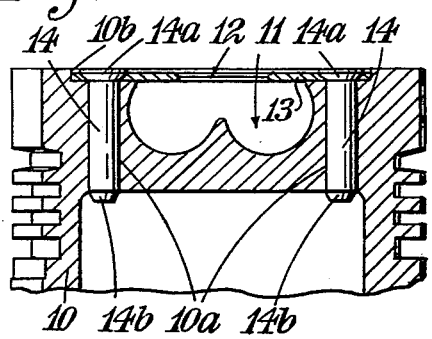
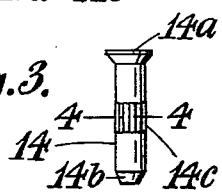
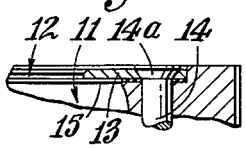
Inventor
Alberto Jorge Morris
By Hooper, Leonard & Buell
his attorneys United States Patent Office 3,112,738
Patented Dec. 3, 1963

3,112,738
PISTONS FOR INTERNAL COMBUSTION
ENGINES
Alberto Jorge Morris, Dursley, England, assignor to R. A. Lister & Company Limited, Dursley, England, a company of Great Britain
Filed May 22, 1962, Ser. No. 196,662
7 Claims. (Cl. 123—32)

This invention comprises improvements in or relating to pistons for internal combustion engines.

According to the present invention, a piston comprises two or more component parts positively held together by pins or pegs which engage with an interference fit in bores in at least one part of the piston.

The invention may be employed for example to retain a plate or section of heat resistant material in position on the crown of the piston which is formed from a material liable to thermal attack, for example from a light alloy. The invention permits such protective plates to be thinner than protective parts which are threaded in position.

The invention has an important use in connection with pistons of the class having a recess in the crown forming an "enclosed" combustion space and a port in the crown surface giving access to the recess.

According to a preferred arrangement of this invention, in a piston of this class, the access port is formed in a thin plate of heat resistant material which is secured to the crown of the piston by pins or pegs having an interference fit in bores in the crown of the piston.

If desired, a thin disc of heat insulating material may be provided between the plate and the main body of the piston, the incorporation of such heat insulating material being facilitated by the use of pegs to retain the plate in position. The provision of such heat insulating material improves combustion efficiency.

Clearly in determining the dimensions of the pins or pegs in relation to the dimensions of the bores regard is had to the coefficients of thermal expansion of the various materials employed and to the range of temperatures liable to be experienced in use of the piston, and the interference fit will be selected so that loosening of the connection in use is avoided.

The invention avoids the need for threaded recesses or bores to receive threaded plugs or studs which are susceptible to loosening in use, and simplifies manufacture.

According to a feature of this invention, the pins or pegs may be formed with heads to engage recesses in a part other than that formed with the peg receiving bores, for instance in the heat resistant plate or section attached to the crown of a piston. Preferably, the heads are of the countersunk type, so as to avoid heavy shear loads in the pins or pegs due to differential thermal expansion of the parts. The ends of the pins or pegs remote from the head may project from the underside of the crown and may be peened over or riveted to form a second retaining head.

If, for any reason, the parts to be connected must be brought together in a particular relationship, the pegs or pins may have such geometrical disposition as to ensure that the parts are correctly assembled.

One embodiment of piston of this invention will now be described by way of example with reference to the accompanying drawings, in which:

FIGURE 1 is a plan view of the piston,
FIGURE 2 is a section on the line 2—2 of FIGURE 1,
FIGURE 3 shows a modified form of peg,
FIGURE 4 is a section on the line 4—4 of FIGURE 3 to a larger scale,
FIGURE 5 is a detail of part of the pegs shown in FIGURE 3, and
FIGURE 6 is a fragmentary detailed view of the upper right-hand corner of FIGURE 2.

The piston 10 (FIGURES 1 and 2) is formed from a low expansion aluminum silicon alloy having a coefficient of expansion of about $11.0 \times 10^{-6}$ ins. per inch per ° F. The piston has in its crown an "enclosed" toroidal combustion chamber 11 shaped for example as described in British specification No. 715,524. The combustion chamber 11 has a port 12 opening to the surface of the piston crown, the port being of smaller diameter than the outer walls of the toroidal combustion chamber 11.

In the present arrangement, the port is formed in a thin plate 13 of heat resistant metal which is secured to the piston by a number of pegs 14 extending through holes in the plate into bores 10a in the main body of the piston 10.

The plate 13 and pegs 14 are of a silicon chrome steel having a coefficient of thermal expansion of about $7.0 \times 10^{-6}$ ins. per inch per ° F. Stainless steel may also be used for these parts.

The crown of the piston 10 is provided with a shallow recess 10b extending radially outwards from the periphery of the toroidal combustion chamber and the plate 13 is let into the shallow recess.

The holes in the plate through which the pegs 14 extend are countersunk and the pegs are provided with appropriately shaped heads 14a to fit snugly into the countersunk holes. This arrangement has the advantage that heavy shear loads in the pegs due to differential expansion are avoided.

The bores 10a extend lengthwise in the main body of the piston 10 and can be produced accurately using conventional and inexpensive machinery and the diameter of the bores 10a is less than the diameter of the pegs 14 so that the pegs are an interference fit in the bores and retain the plate firmly in position under all operating conditions. The relative dimensions of the bores and pegs are chosen having regard to the physical properties, including thermal coefficients of expansion, of the materials employed and the temperature variations likely to be encountered in use so that the plate does not become loose. The interference employed should not of course be so great as to overstress the piston. For instance, with materials as above mentioned and a nominal peg diameter of $\frac{7}{32}$ inch, an interference of from 0.0004 to 0.0016 inch at room temperature may be employed.

The pegs 14 have at their ends tapered portions 14b having a taper of say 15°, which portions not only assist entry into the bores 10a, but also give a burnishing action as the pegs are entered into the bores thereby to ensure a good fit.

If desired after insertion the ends 14b may be peened over to provide a second retaining head.

Referring to FIGURE 6, if desired, a thin disc of heat insulating material 15 may be provided between the plate 13 and the main body of the piston 10, the incorporation of such heat insulating material being facilitated by the use of pegs 14 to retain the plate 13 in position. The provision of such heat insulating material improves combustion efficiency.

FIGURES 3 to 5 show an alternative form of peg by which improved locking is obtained. The peg 14 has a countersunk head 14a and tapered end 14b as above described, and also has a central portion of its shank knurled, as indicated at 14c (FIGURE 3) so as to provide around the shank a series of equally-spaced longitudinal indentations 14d and longitudinal projections 14e (FIGURES 4 and 5). For instance there may be 12 projections having a height of .002 inch. A lead 14f, of say 30°, is provided at each end of the indentations 14d and projections 14e to prevent shearing of the metal of the piston as the pegs are driven home.

The arrangement not only has advantages in production by reason that threading is unnecessary, but it also enables the weight of the piston and thus its inertia to be reduced since the heat resistant plate may be made much thinner than would be the case if for example the heat resistant surface were to be formed by a screwed-in insert. Also the pegs are self locking, unlike counter-sunk screws which are difficult to lock in position.

Improved combustion efficiency may also be obtained if desired by interposing a thin layer of heat insulating material between the plate 13 and piston 10 as already discussed.

When the port 12 is to be offset from the centre line of the piston 10 or of the toroidal combustion chamber 11, the pegs 14 and bores 10a are preferably non-uniformly disposed so that in assembly the plate 13 is always correctly offered up to the main body of the piston and cannot be incorrectly positioned.

I claim:
1. A piston having
   (a) a crown which has a top surface and an under surface and which also has a ring of cylindrical bores extending through the thickness of the crown from the top surface thereof to the under surface,
   (b) a thin plate of heat resistant metal mounted on the top surface of the crown, said thin plate having in it
   (c) a correspondingly positioned ring of countersunk holes each of which registers with and tapers towards a corresponding one of the bores in the crown, and
   (d) a series of pegs retaining the plate in position, each peg comprising at one end
   (e) a conical head to be received in one of said countersunk holes and
   (f) a cylindrical shank extending from said head and through the registering bore,
   (g) the shank and said bore having an interference fit at room temperature such that the pegs retain the plate in position against the crown when the piston becomes hot in operation.

2. A piston according to claim 1, comprising a thin disc of heat insulating material between the thin plate of heat resistant metal and the main body of the piston.

3. A piston according to claim 1, the shanks of the pegs having portions which are remote from the heads and which project from the under surface of the crown and are deformed to provide a second retaining head.

4. A piston according to claim 1, the holes and the bores have like asymmetrical geometrical dispositions thereby to ensure that the parts are correctly assembled.

5. A piston according to claim 1, the shanks of the pegs having knurled surfaces where they engage the bores.

6. A piston having
   (a) a crown which has a top surface and an under surface and which also has a ring of cylindrical bores extending through the thickness of the crown from the top surface thereof to the under surface,
   (b) a thin plate of heat resistant metal mounted on the top surface of the crown, said thin plate having in it
   (c) a correspondingly positioned ring of countersunk holes each of which registers with and tapers towards a corresponding one of the bores in the crown, and
   (d) a series of pegs retaining the plate in position, each peg comprising at one end
   (e) a conical head to be received in one of said countersunk holes and
   (f) said bores prior to insertion of the pegs having a diameter less than the external diameter of the shanks whereby the pegs engage the bores with an interference fit at room temperature such that the pegs retain the plate in position against the crown when the piston becomes hot in operation.

7. A piston having
   (a) a crown which has a top surface and an under surface, has a ring of cylindrical bores extending through the thickness of the crown from the top surface to the under surface, and has therein a recess with a mouth in the top surface thereby to form a toroidal combustion space,
   (b) a thin plate of heat resistant metal mounted on the top surface of the crown, said thin plate having in it
   (c) a correspondingly positioned ring of countersunk holes each of which registers with and tapers towards a corresponding one of the bores in the crown and a port registering with the mouth of the recess, and
   (d) a series of pegs retaining the plate in position, each peg comprising at one end
   (e) a conical head to be received in one of said countersunk holes and
   (f) a cylindrical shank extending from said head and through the registering bore,
   (g) the shank and said bore having an interference fit at room temperature such that the pegs retain the plate in position against the crown when the piston becomes hot in operation.

References Cited in the file of this patent

UNITED STATES PATENTS

| | | |
|---|---|---|
| 1,407,202 | Kubler | Feb. 21, 1922 |
| 1,548,329 | Nelson | Aug. 4, 1925 |
| 1,593,265 | Kunze | July 20, 1926 |
| 2,194,097 | Reggio | Mar. 19, 1940 |
| 2,858,814 | Meurer | Nov. 4, 1958 |

FOREIGN PATENTS

| | | |
|---|---|---|
| 160,790 | Great Britain | Dec. 22, 1921 |